(12) United States Patent
Shi et al.

(10) Patent No.: US 11,641,625 B2
(45) Date of Patent: May 2, 2023

(54) INFORMATION TRANSMISSION METHOD FOR ULTRASONIC TRANSMITTER, INFORMATION TRANSMISSION DEVICE FOR ULTRASONIC TRANSMITTER, AND STORAGE MEDIUM

(71) Applicant: BEIJING XIAOMI MOBILE SOFTWARE CO., LTD., Beijing (CN)

(72) Inventors: Runyu Shi, Beijing (CN); Xueyang Lv, Beijing (CN); Wei Lu, Beijing (CN); Kai Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 134 days.

(21) Appl. No.: 17/205,431

(22) Filed: Mar. 18, 2021

(65) Prior Publication Data

US 2021/0410066 A1    Dec. 30, 2021

(30) Foreign Application Priority Data

Jun. 24, 2020 (CN) ......................... 202010591091.6

(51) Int. Cl.
*H04B 11/00* (2006.01)
*H04L 27/26* (2006.01)
*H04W 52/02* (2009.01)

(52) U.S. Cl.
CPC ........ *H04W 52/0229* (2013.01); *H04B 11/00* (2013.01); *H04L 27/26025* (2021.01)

(58) Field of Classification Search
CPC ......... G10L 19/20; G10L 25/27; H04B 11/00; H04L 27/26025; H04W 52/0229
See application file for complete search history.

(56) References Cited

U.S. PATENT DOCUMENTS

| 9,361,877 B2 | 6/2016 | Antonio et al. |
| 2013/0271088 A1 | 10/2013 | Hwang et al. |
| 2014/0050321 A1* | 2/2014 | Albert ............... A61B 5/002 367/137 |

(Continued)

FOREIGN PATENT DOCUMENTS

| CN | 103959201 A | 7/2014 |
| CN | 109814457 A | 5/2019 |

(Continued)

OTHER PUBLICATIONS

Chinese Patent Application No. 202010591091.6 First Office Action dated Apr. 1, 2021, 9 pages.

(Continued)

*Primary Examiner* — Melvin C Marcelo
*Assistant Examiner* — Natali Pascual Peguero
(74) *Attorney, Agent, or Firm* — Cozen O'Connor

(57) ABSTRACT

An information transmission method, an information transmission apparatus, and a storage medium include encoding information to be transmitted to obtain an ultrasonic encoded signal; obtaining an ultrasonic transmission signal based on the ultrasonic encoded signal and an ultrasonic wake-up signal, the ultrasonic wake-up signal for waking up an ultrasonic receiver to decode the ultrasonic encoded signal; and transmitting the ultrasonic transmission signal to the ultrasonic receiver.

18 Claims, 10 Drawing Sheets

(56) References Cited

U.S. PATENT DOCUMENTS

2014/0119162 A1* 5/2014 Yeary ................. G10K 11/24
367/178
2017/0141811 A1* 5/2017 Gabai ................. G10L 19/018

FOREIGN PATENT DOCUMENTS

| WO | WO 2010051728 A1 | 5/2010 |
| WO | WO 2016001879 A1 | 1/2016 |

OTHER PUBLICATIONS

Chinese Patent Application No. 202010591091.6 English translation of First Office Action dated Apr. 1, 2021, 10 pages.
Indian Patent Application No. 202144013069 Office Action dated Feb. 4, 2022, 6 pages.
European Patent Application No. 21165719.2 extended Search and Opinion dated Sep. 28, 2021, 10 pages.

* cited by examiner

INFORMATION TRANSMISSION METHOD FOR ULTRASONIC TRANSMITTER, INFORMATION TRANSMISSION DEVICE FOR ULTRASONIC TRANSMITTER, AND STORAGE MEDIUM

CROSS-REFERENCE TO RELATED APPLICATION

This application claims priority to Chinese Patent Application No. 202010591091.6, filed on Jun. 24, 2020, the entire contents of which are incorporated herein by reference.

TECHNICAL FIELD

The disclosure generally relates to the field of information transmission technologies, and more particularly, to an information transmission method, an information transmission device, and a storage medium.

BACKGROUND

A low-cost solution for short-range wireless information transmission may be based on ultrasonic waves.

The process of information transmission based on ultrasonic waves encodes information to be transmitted into ultrasonic data, and decodes the ultrasonic data into the information that was transmitted.

To decode the ultrasonic data in time, a decoding device is continuously working, which may increase power consumption of the decoding device. Even if the decoding device is operating continuously, manual intervention is required to turn on or off the decoding device, which may result in a poor user experience for users.

SUMMARY

According to a first aspect of embodiments of the disclosure, there is provided an information transmission method for an ultrasonic transmitter, including: encoding information to be transmitted to obtain an ultrasonic encoded signal; obtaining an ultrasonic transmission signal based on the ultrasonic encoded signal and an ultrasonic wake-up signal, the ultrasonic wake-up signal for waking up an ultrasonic receiver to decode the ultrasonic encoded signal; and transmitting the ultrasonic transmission signal to the ultrasonic receiver.

According to a second aspect of embodiments of the disclosure, there is provided an information transmission method for an ultrasonic receiver, including: receiving an ultrasonic transmission signal from an ultrasonic transmitter; determining whether an ultrasonic wake-up signal exists in the ultrasonic transmission signal; and when the ultrasonic wake-up signal exists in the ultrasonic transmission signal, decoding an ultrasonic encoded signal in the ultrasonic transmission signal to obtain transmission information corresponding to the ultrasonic encoded signal.

According to a third aspect of embodiments of the disclosure, there is provided an information transmission device, including: a processor; and a memory for storing instructions executable by the processor. The processor is configured to execute the instructions to perform any method in the first aspect of embodiments or the second aspect of embodiments.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Information transmission through wireless technologies has become one of information transmission methods commonly used in the short range.

Infrared radiation transmission, wireless electromagnetic wave transmission, and ultrasonic transmission may be often employed for the short-range wireless data transmission.

Although the infrared radiation information transmission may be inexpensive and easy to implement, the infrared radiation information transmission requires a visible communication between a transmitter and a receiver. Once the communication is interrupted, the infrared radiation information transmission may also be interrupted.

Although the radio wave information transmission may ensure timeliness and accuracy of information transmission, this transmission method has a relatively high cost when implemented. In addition, various countries have different regulations on radio waves. Therefore, it is impossible to employ a unified transmission method or a unified frequency band for information transmission worldwide.

The ultrasonic transmission is easy to implement and is less costly. In addition, locations of a transmitting device and a receiving device that employ the ultrasonic information transmission may be relatively free. Furthermore, currently, the commonly-used terminal equipment originally has ultrasonic transmitting equipment and ultrasonic receiving equipment such as speaker, telephone receiver, microphone, and no additional cost may be incurred in hardware. Therefore, the short-range, low-volume information transmission based on ultrasonic waves has broad application prospects.

The disclosure provides an information transmission method, which may ensure that a decoding device in the ultrasonic receiver may not have to be working all the time on the premise that the ultrasonic receiver may decode in time, thereby reducing the power consumption of the ultrasonic receiver, and improving the user experience.

Figure 1:
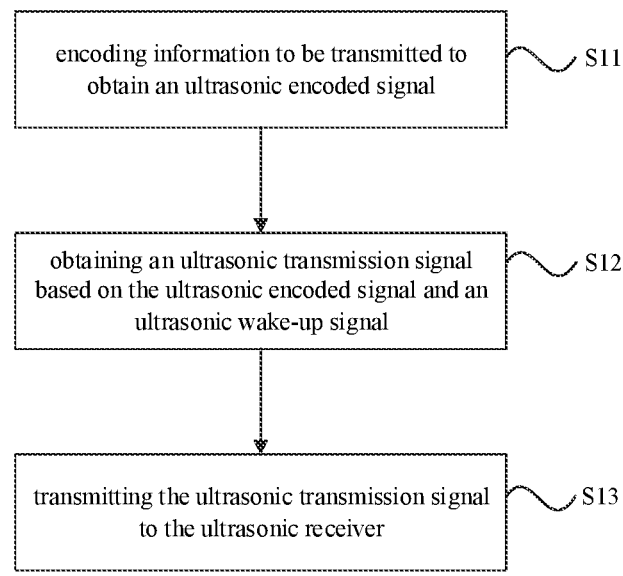
FIG. 1 is a flow chart of an information transmission method, according to exemplary embodiments of the disclosure.

FIG. 1 is a flow chart of an information transmission method, according to exemplary embodiments of the disclosure. As illustrated in FIG. 1, the information transmission method is applicable to an ultrasonic transmitter. The method may include the following.

At block S11, information to be transmitted is encoded to obtain an ultrasonic encoded signal.

The information to be transmitted may be data information that needs to be transmitted, or text information that needs to be transmitted. The information to be transmitted may include characters. Furthermore, the information to be transmitted may include a plurality of characters arranged in sequence. For example, the information to be transmitted may be identity document (ID) of a payment page, or service set identifier (S SID) of a WIFI (Wireless Fidelity) network of a WIFI page, or an instruction to be executed.

The information to be transmitted may be converted through encoding into the ultrasonic encoded signal in a form of ultrasonic waves, so that the ultrasonic encoded signal may be transmitted in a form of ultrasonic signals.

At block S12, an ultrasonic transmission signal is obtained based on the ultrasonic encoded signal and an ultrasonic wake-up signal. The ultrasonic wake-up signal is configured to wake up an ultrasonic receiver to decode the ultrasonic encoded signal.

The ultrasonic encoded signal and the ultrasonic wake-up signal may be integrated and processed to obtain the ultrasonic transmission signal.

Figure 2:
FIG. 2 is a schematic diagram of an ultrasonic wake-up signal, according to exemplary embodiments of the disclosure.

FIG. 2 is a schematic diagram of an ultrasonic wake-up signal, according to exemplary embodiments of the disclosure.

As illustrated in FIG. 2, the ultrasonic wake-up signal may be a signal in a form of ultrasonic waves.

In some embodiments, the information transmission method may generate the ultrasonic wake-up signal in advance before obtaining the ultrasonic transmission signal based on the ultrasonic encoded signal and the ultrasonic wake-up signal.

The ultrasonic wake-up signal may be directly obtained through combinatorial encoding on one or more preset frequencies. For example, the ultrasonic wake-up signal may be an ultrasonic signal with preset frequencies of 1 kHz, 2 kHz, and 3 kHz, respectively. The preset frequencies may be adjusted based on actual conditions. The preset frequency may not be specifically limited in the disclosure.

Furthermore, the ultrasonic wake-up signal may be obtained as follows. Designated information may be converted to obtain designated frequency information based on the designated information. Combinatorial encoding may be performed on the designated frequency information to obtain the ultrasonic wake-up signal based on the designated frequency information.

Furthermore, the information transmission method may further obtain the designated information before generating the ultrasonic wake-up signal. The designated information may include at least one of the following: one or more sinusoidal frequency signals, designated text information, or one or more designated audio signals.

It may be seen from the above embodiments that the ultrasonic wake-up signal may be an ultrasonic signal with one or more preset frequencies.

Since the ultrasonic encoded signal and the ultrasonic wake-up signal are both signals in the form of ultrasonic waves, the ultrasonic transmission signal obtained based on the ultrasonic encoded signal and the ultrasonic wake-up signal is also a signal in the form of ultrasonic waves. Furthermore, the ultrasonic transmission signal may be transmitted in the form of ultrasonic waves.

The ultrasonic wake-up signal is configured to wake up an ultrasonic receiver to decode the ultrasonic encoded signal.

When the ultrasonic receiver receives the ultrasonic wake-up signal, the ultrasonic receiver may respond to the ultrasonic wake-up signal and launch to decode the ultrasonic encoded signal in the ultrasonic transmission signal. When the ultrasonic receiver does not receive the ultrasonic wake-up signal, the decoding device of the ultrasonic receiver may always be turned off. In this way, the power consumption of the decoding device of the ultrasonic receiver may be reduced on the premise of ensuring timely decoding by the ultrasonic receiver.

At block S13, the ultrasonic transmission signal is transmitted to the ultrasonic receiver.

The ultrasonic transmitter may transmit the ultrasonic transmission signal in the form of ultrasonic waves to the ultrasonic receiver. In detail, the ultrasonic transmission signal may be converted from a digital signal to an analog signal through a digital-to-analog converter (DAC), and may be transmitted in the form of ultrasonic waves through the ultrasonic emitter.

The ultrasonic transmitter may be the ultrasonic emitter, such as a speaker. The ultrasonic receiver may be an ultrasonic acceptor such as a telephone receiver or a microphone.

The disclosure provides an information transmission method, which may ensure that a decoding device in the ultrasonic receiver may not have to be working all the time on the premise that the ultrasonic receiver may decode in time, thereby reducing the power consumption of the ultrasonic receiver, and improving the user experience.

In some embodiments of the disclosure, a frequency of the ultrasonic encoded signal is within a first frequency band; and a frequency of the ultrasonic wake-up signal is within a second frequency band; in which, the first frequency band is different from the second frequency band.

When the ultrasonic receiver receives the ultrasonic wake-up signal in the ultrasonic transmission signal, the ultrasonic receiver may launch the decoding work on the ultrasonic encoded signal in the ultrasonic transmission signal. Therefore, the ultrasonic wake-up signal needs to be distinguished from the ultrasonic encoded signal, in the ultrasonic transmission signal.

By setting the frequency of the ultrasonic encoded signal within the first frequency band and setting the frequency of the ultrasonic wake-up signal within the second frequency band, the ultrasonic wake-up signal may be distinguished from the ultrasonic encoded signal effectively, so that it lays a foundation for the ultrasonic receiver to accurately receive and respond to the ultrasonic wake-up signal in the ultrasonic transmission signal.

In some embodiments, the first frequency band and the second frequency band nay differ in order of magnitude. For example, the first frequency band may be 15 kHz-25 kHz, and the second frequency may be 1 kHz-5 kHz.

After the corresponding ultrasonic receiver receives the ultrasonic transmission signal in the form of ultrasonic waves, it needs to convert an acoustic analog signal into a digital signal through sampling, and it also needs firstly to determine whether there is the wake-up signal in the received signal. When there is the wake-up signal in the received signal, the encoded signal in the signal is decoded. The upper frequency limit of the sampled digital signal is the frequency value of the sampling rate according to a relationship between sampling rates and signal frequencies. In other words, signals with frequencies higher than the frequency of the sampling rate may not be completely sampled and converted into digital signals. Therefore, in order to ensure that the wake-up signal may be determined, the sampling rate should be at least higher than the frequency of the wake-up signal. Since determining whether there is the wake-up signal is the first thing that the ultrasonic receiver needs to process after receiving the ultrasonic wave, the sampling element (analog-to-digital converter ADC) of the wake-up signal needs to be in a normal turning-on state, to ensure that it may be determined timely after the signal is received. The sampling rate directly affects the power consumption of the element. The element with the high sampling rate has the high power consumption. The element with the low sampling rate has the low power consumption. When it is necessary to ensure that the element is in the normal turning-on state, the second frequency band with lower frequencies may be employed for the ultrasonic wake-up signal and the first frequency band with higher frequencies may be employed for the ultrasonic encoded signal. Therefore, the sampling element of the wake-up signal does not need to employ the high sampling rate, but employ the low sampling rate to keep it normally to be turned on, thereby reducing power consumption. The specific sampling and determining manners may be described in detail in the description of the ultrasonic receiver below.

Figure 3:
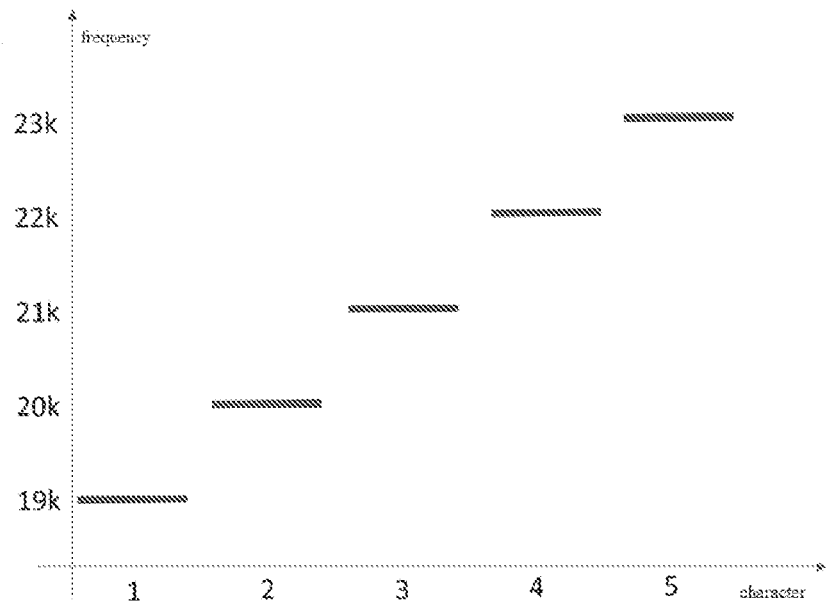
FIG. 3 is a schematic diagram of a correspondence between characters and encoded sub-signals, according to exemplary embodiments of the disclosure.

FIG. 3 is a schematic diagram of a correspondence between characters and encoded sub-signals, according to exemplary embodiments of the disclosure.

As illustrated in FIG. 3, in some embodiments of the disclosure, the information to be transmitted may include a plurality of characters arranged in sequence. Encoding the information to be transmitted to obtain the ultrasonic encoded signal may be realized in the following way.

The plurality of characters may be converted sequentially into a plurality of frequency values based on a correspondence between characters and frequency values.

A plurality of encoded sub-signals corresponding to the plurality of characters may be obtained based on the plurality of frequency values.

The plurality of encoded sub-signals corresponding to the plurality of characters may be sequentially encoded to form the ultrasonic encoded signal.

In order to convert the information to be transmitted into a signal that may be transmitted in the form of ultrasonic waves, it is necessary to convert the information to be transmitted into the ultrasonic encoded signal in the form of ultrasonic waves. Since the information to be transmitted includes the plurality of characters arranged in sequence, each character in the information to be transmitted may be converted into an encoded sub-signal with a specific frequency and in the form of ultrasonic waves. The plurality of encoded sub-signals after the conversion may be formed in sequence to form the ultrasonic encoded signal.

In some embodiments of the disclosure, sequentially converting the plurality of characters into the plurality of frequency values based on the correspondence between characters and frequency values may be realized by the following way.

The plurality of characters may be sequentially converted into a plurality of numbers based on a correspondence between characters and numbers.

The plurality of numbers may be sequentially converted into the plurality of frequency values based on a correspondence between numbers and frequency values.

Since the characters in the information to be transmitted may be numbers, text or letters, the correspondence between characters and numbers may be determined in advance. For example, the characters may be converted into corresponding N-ary number information.

In some embodiments, the characters may be converted into the corresponding N-ary number information according to the ASCII table. For example, the text "a" may be converted into 97 (N=10), 61 (N=16), 141 (N=8) and other number information.

Furthermore, the N-ary number information may be mapped to a specific encoding frequency to obtain the corresponding frequency information based on the correspondence between numbers and frequency values determined in advance.

In some embodiments, the correspondence between characters and frequency values may be determined in advance to generate a character-frequency correspondence table. The characters may be directly mapped to specific encoding frequencies to obtain the corresponding frequency information.

For example, character 1 corresponds to a specific frequency of 19 kHz; character 2 corresponds to a specific frequency of 20 kHz; character 3 corresponds to a specific frequency of 21 kHz; character 4 corresponds to a specific frequency of 22 kHz; character 5 corresponds to a specific frequency of 23 kHz; and the like.

In some embodiments, character a corresponds to a specific frequency of 29 kHz; character b corresponds to a specific frequency of 30 kHz; character c corresponds to a specific frequency of 31 kHz; and the like.

In the disclosure, the frequency value corresponding to the character may be adjusted based on actual situations. In the disclosure, the correspondence between characters and frequency values may not be specifically limited.

In some embodiments, a corresponding acoustic signal in the form of ultrasonic waves, that is, the encoded sub-signal, is generated from the frequency information obtained through converting based on the sinusoidal excitation. Furthermore, the characters may be converted into the encoded sub-signals, and the encoded sub-signals may be arranged and combined in sequence to obtain the encoded signal. The encoded signal may correspond to the information to be transmitted including the plurality of characters arranged in sequence.

In some embodiments, for each corresponding frequency in the frequency information, the corresponding acoustic signal in the form of ultrasonic waves may be generated by a formula of:

$$y = \sin(2\pi\omega t)$$

where, y is the obtained acoustic signal, ω is the corresponding frequency in the frequency information, and t is a duration vector.

If the frame length of the decoding device in the ultrasonic receiver is L sampling points, the length of t needs to be greater than k*L, where k is an anti-noise coefficient, for example, k may be 3. Setting t to be greater than k*L may avoid that the decoding device may not effectively capture the acoustic signal because the acoustic signal is too short, and the data information to be transmitted is missed.

In some embodiments of the disclosure, the plurality of encoded sub-signals may be arranged in a sequential order to obtain the ultrasonic encoded signal. The sequential order refers to the order in which the plurality of characters may be arranged in sequence to form the information to be transmitted.

When frequencies of adjacent encoded sub-signals are the same, the adjacent encoded sub-signals may be connected directly. When frequencies of adjacent encoded sub-signals are different, the adjacent encoded sub-signals may be connected through frequency shifting.

Different encoded sub-signals may be connected to obtain the ultrasonic encoded signal through frequency shifting. It may shorten the transmission duration of the entire ultrasonic encoded signal while ensuring that the ultrasonic encoded signal formed by connecting may not produce audible noises, improving the signal transmission efficiency.

In some embodiments of the disclosure, if the frequencies corresponding to the encoded sub-signals connected through frequency shifting are $f_0$ and $f_1$, and the frequency shifting duration is N sampling points, the frequency shifting manner may be realized by formulas of:

$$y = \sin(2\pi(f_0 + kt)t) \quad t = 0, 1, \ldots (N-1), \text{ or}$$

$$y = \sin\left(\frac{2\pi(f_0 + k^t)}{\log k}\right) \quad t = 0, 1, \ldots (N-1),$$

where, y is the acoustic signal at the connection, k is a frequency shifting rate, and $$k = \frac{(f_1 - f_0)}{N}.$$

In some embodiments of the disclosure, sequentially encoding the plurality of encoded sub-signals corresponding to the plurality of characters to form the ultrasonic encoded signal may be realized by the following way.

A fade-in may be added before an encoded sub-signal corresponding to a first character, and a fade-out may be added after an encoded sub-signal corresponding to a last character, to form the ultrasonic encoded signal.

The manner of adding the fade-in may be linear interpolation or logarithmic interpolation. The manner of adding the fade-in may be not specifically limited in the disclosure.

The manner of adding the fade-out may be linear interpolation or logarithmic interpolation. The manner of adding the fade-out may be not specifically limited in the disclosure.

Figure 4:
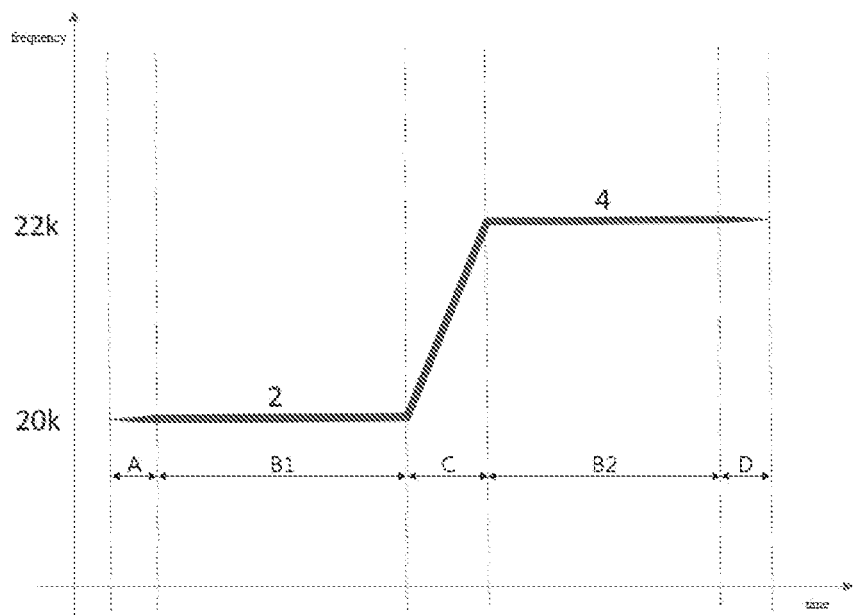
FIG. 4 is a schematic diagram of an ultrasonic encoded signal, according to exemplary embodiments of the disclosure.

FIG. 4 is a schematic diagram of an ultrasonic encoded signal, according to exemplary embodiments of the disclosure.

As illustrated in FIG. 4, in some embodiments, FIG. 4 illustrates an ultrasonic encoded signal through a frequency-shifted connection, with the fade-in added before the encoded sub-signal corresponding to the first character, and the fade-out added after the encode sub-signal corresponding to the last character.

A represents the added fade-in; B1 represents the encoded sub-signal at which character 2 is subjected to encoding processing; B2 represents the encoded sub-signal at which character 4 is subjected to encoding processing; C represents the frequency shifting processing of connecting the encoded sub-signal B1 and encoded sub-signal B2; and D represents the added fade-out.

In some embodiments of the disclosure, combinatorial encoding may be performed on the ultrasonic encoded signal and the ultrasonic wake-up signal to obtain the ultrasonic transmission signal.

In some embodiments of the disclosure, performing combinatorial encoding on the ultrasonic encoded signal and the ultrasonic wake-up signal to obtain the ultrasonic transmission signal may be realized by the following way.

A blank signal is inserted between the ultrasonic wake-up signal and the ultrasonic encoded signal. The ultrasonic wake-up signal, the blank signal, and the ultrasonic encoded signal may be spliced sequentially to obtain the ultrasonic transmission signal. The signal length of the ultrasonic transmission signal is the sum of the signal lengths of the ultrasonic wake-up signal, the blank signal, and the ultrasonic encoded signal.

The ultrasonic transmission signal may be obtained by sequentially splicing the ultrasonic wake-up signal, the blank signal, and the ultrasonic encoded signal. The blank signal is configured to distinguish the ultrasonic wake-up signal from the ultrasonic encoded signal. The signal length of the blank signal is related to the duration required for the ultrasonic receiver to launch decoding after receiving the ultrasonic wake-up signal. For example, the signal length of the blank signal is related to the recording duration of the analog-to-digital converter at the ultrasonic receiver which converts the ultrasonic encoded signal from an analog signal to a digital signal, so that the analog-to-digital converter may completely receive the encoded information in the entire ultrasonic transmission signal, ensuring that the information to be transmitted may not be missed during the transmission process.

Figure 5:
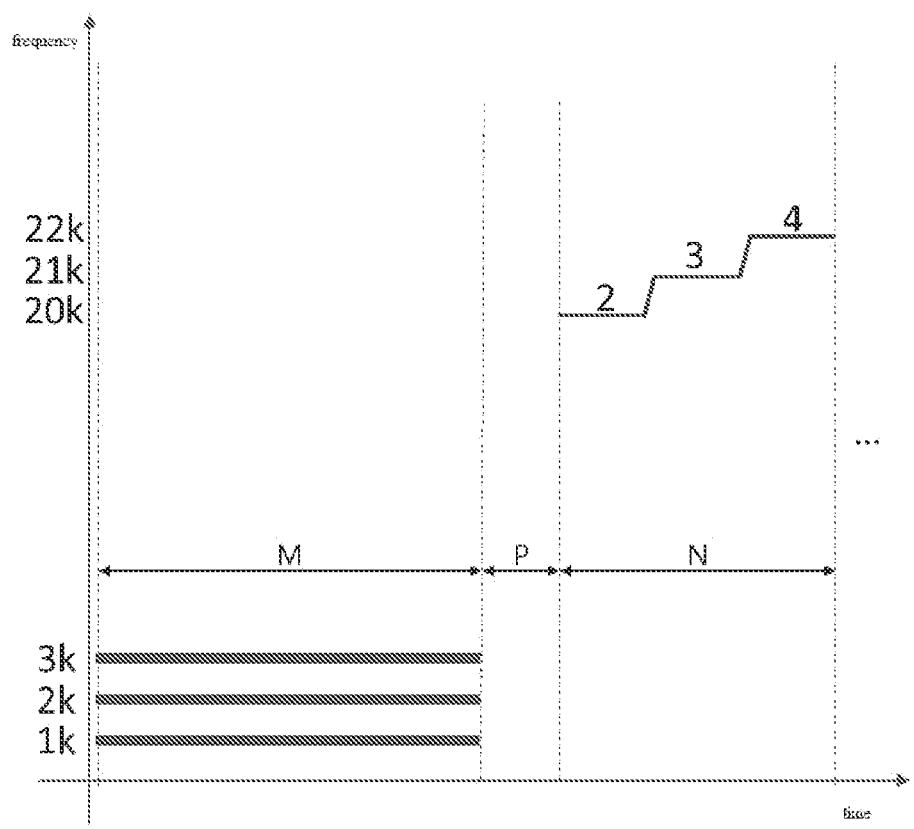
FIG. 5 is a schematic diagram of an ultrasonic transmission signal, according to exemplary embodiments of the disclosure.

FIG. 5 is a schematic diagram of an ultrasonic transmission signal, according to exemplary embodiments of the disclosure.

As illustrated in FIG. 5, in some embodiments, FIG. 5 illustrates an ultrasonic transmission signal formed by sequentially splicing the ultrasonic wake-up signal, the blank signal, and the ultrasonic encoded signal. M represents the ultrasonic wake-up signal, which is an ultrasonic signal with preset frequencies of 1 kHz, 2 kHz and 3 kHz respectively; P represents the blank signal; and N represents the ultrasonic encoded signal, which corresponds to the encoded signal of the information "234" to be transmitted. The signal length of the ultrasonic transmission signal is determined by the sum of M, P and N.

In some embodiments of the disclosure, performing combinatorial encoding on the ultrasonic encoded signal and the ultrasonic wake-up signal to obtain the ultrasonic transmission signal may be realized by the following way.

The ultrasonic wake-up signal and the ultrasonic encoded signal may be superimposed and combined to obtain the ultrasonic transmission signal. The signal length of the ultrasonic transmission signal is determined based on the longer signal length between the ultrasonic wake-up signal and the ultrasonic encoded signal.

The ultrasonic transmission signal may be obtained by superimposing directly the ultrasonic wake-up signal and the ultrasonic encoded signal. Since the ultrasonic encoded signal is within the first frequency band and the ultrasonic wake-up signal is within the second frequency band, that is, the frequencies of the ultrasonic encoded signal and the ultrasonic wake-up signal are in different frequency bands, the two signals may not be confused in the frequency spectrum.

Figure 6:
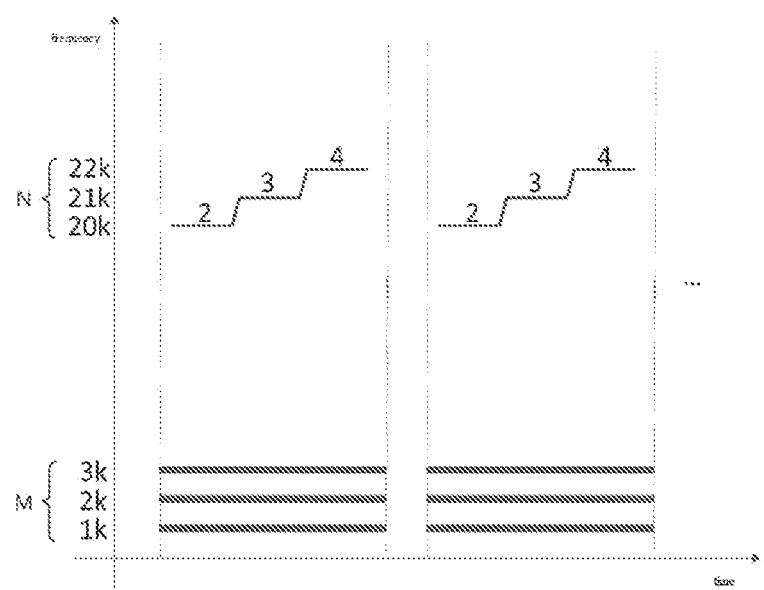
FIG. 6 is a schematic diagram of an ultrasonic transmission signal, according to exemplary embodiments of the disclosure.

FIG. 6 is a schematic diagram of an ultrasonic transmission signal, according to exemplary embodiments of the disclosure.

As illustrated in FIG. 6, in some embodiments, FIG. 6 illustrates an ultrasonic transmission signal obtained by superposing and combining the ultrasonic wake-up signal and the ultrasonic encoded signal. M represents the ultrasonic wake-up signal, which is an ultrasonic signal with preset frequencies of 1 kHz, 2 kHz and 3 kHz respectively; and N represents the ultrasonic encoded signal, which corresponds to the encoded signal of the information "234" to be transmitted.

In some embodiments, the ultrasonic transmission signal may be obtained after digital-to-analog conversion processing.

After the ultrasonic transmission signal is obtained, the digital-to-analog converter may be employed to convert the ultrasonic transmission signal from a digital signal to an analog signal. The ultrasonic transmission signal in the form of the analog signal may facilitate the transmission of the ultrasonic transmission signal from the ultrasonic transmitter to the ultrasonic receiver on the premise of ensuring the integrity of the signal.

In some embodiments of the disclosure, transmitting the ultrasonic transmission signal to the ultrasonic receive may be realized by the following way.

The ultrasonic transmission signal may be transmitted to the ultrasonic receiver at a preset interval.

The preset interval may be adjusted based on the actual conditions. The preset interval may not be specifically limited in the disclosure.

In some embodiments, for the ultrasonic transmission signal obtained by inserting the blank signal between the ultrasonic wake-up signal and the ultrasonic encoded signal and splicing and combining them in sequence, or for the ultrasonic transmission signal obtained by superposing and combining the ultrasonic wake-up signal and the ultrasonic encoded signal, all of the ultrasonic transmission signals may be repeatedly transmitted without an external instruction to stop transmitting.

A certain delay needs to be added between the two ultrasonic transmission signals that are repeatedly transmitted. The length of the delay may be greater than k times of the frame length of the decoding device in the ultrasonic receiver, where k is an anti-noise coefficient. In some embodiments, k may be 3. In this way, it may avoid that the decoding device may not effectively capture the acoustic signal because the acoustic signal is too short, and the data information to be transmitted is missed.

Based on the same concept, a second aspect of the disclosure may further provide another information transmission method.

Figure 7:
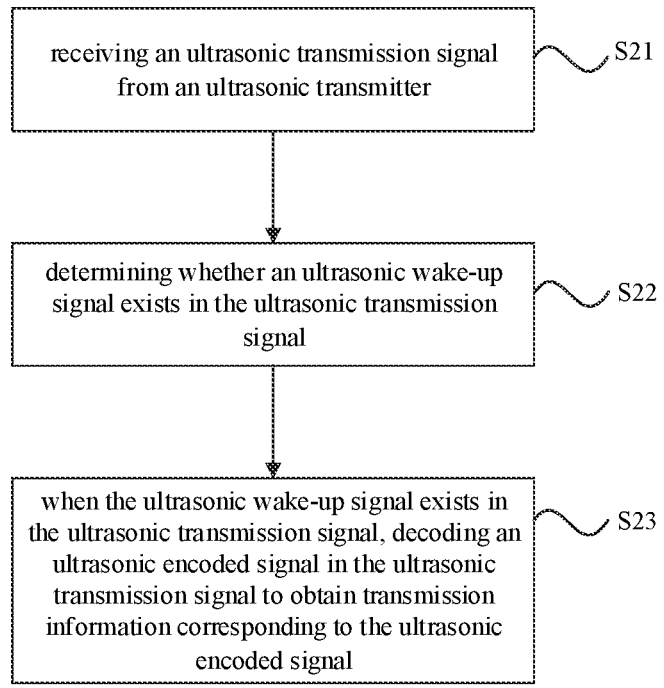
FIG. 7 is a flow chart of an information transmission method, according to exemplary embodiments of the disclosure.

FIG. 7 is a flow chart of an information transmission method, according to exemplary embodiments of the disclosure. As illustrated in FIG. 7, the information transmission method is applicable to an ultrasonic receiver. The method may include the following.

At block S21, an ultrasonic transmission signal is received from an ultrasonic transmitter.

At block S22, it is determined whether an ultrasonic wake-up signal exists in the ultrasonic transmission signal.

At block S23, when the ultrasonic wake-up signal exists in the ultrasonic transmission signal, an ultrasonic encoded signal in the ultrasonic transmission signal is decoded to obtain transmission information corresponding to the ultrasonic encoded signal.

The ultrasonic receiver may receive an acoustic analog signal through a acoustic wave receiver. After receiving the acoustic analog signal, it is determined first whether there is a wake-up signal. When the ultrasonic receiver determines that the ultrasonic wake-up signal exists in the ultrasonic transmission signal, the ultrasonic receiver may respond to the ultrasonic wake-up signal and launch the work of decoding the ultrasonic encoded signal in the ultrasonic transmission signal to obtain the transmission information corresponding to the ultrasonic encoded signal. The transmission information may be the information to be transmitted from the ultrasonic transmitter in any of the foregoing embodiments. In this way, on the premise of ensuring timely decoding of the ultrasonic receiver, the decoding device in the ultrasonic receiver may not have to be working all the time, thereby reducing the power consumption of the ultrasonic receiver and improving the user experience.

In some embodiments of the disclosure, a frequency of the ultrasonic wake-up signal is within a second frequency band.

Decoding the ultrasonic encoded signal in the ultrasonic transmission signal may be realized by the following way.

Based on the first frequency band that is different from the second frequency band, the ultrasonic encoded signal in the ultrasonic transmission signal may be decoded.

Because the first frequency band is different from the second frequency band, the ultrasonic wake-up signal and the ultrasonic encoded signal may be significantly different. Therefore, when the ultrasonic receiver receives the ultrasonic transmission signal and determines whether there is the ultrasonic wake-up signal in the ultrasonic transmission signal, it may be guaranteed that there may be no interference with the determination of the ultrasonic wake-up signal due to the existence of the ultrasonic encoded signal.

Figure 8:
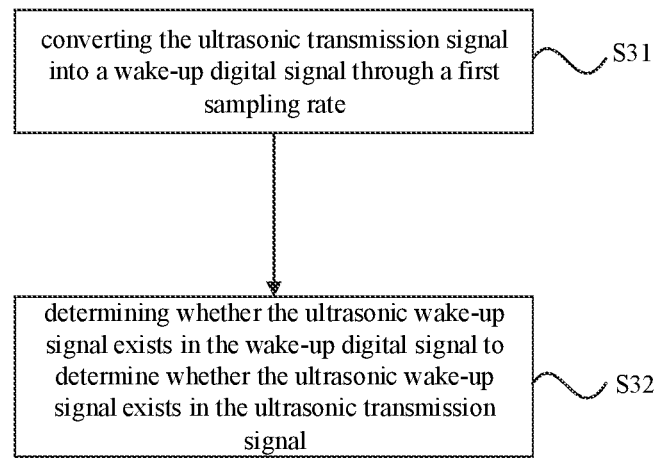
FIG. 8 is a flow chart of determining whether an ultrasonic wake-up signal exists in an ultrasonic transmission signal, according to exemplary embodiments of the disclosure.
Figure 9:
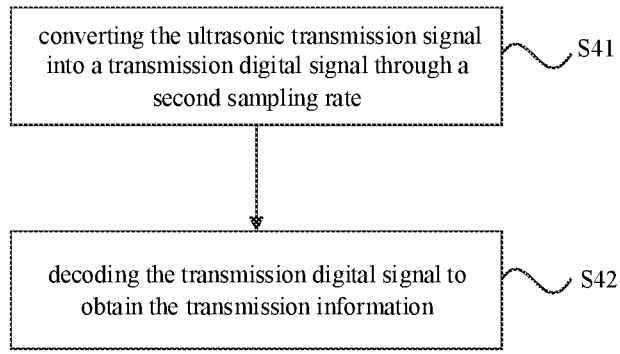
FIG. 9 is a flow chart of decoding an ultrasonic encoded signal in an ultrasonic transmission signal, according to exemplary embodiments of the disclosure.

FIG. 8 is a flow chart of determining whether an ultrasonic wake-up signal exists in an ultrasonic transmission signal, according to exemplary embodiments of the disclosure. FIG. 9 is a flow chart of decoding an ultrasonic encoded signal in an ultrasonic transmission signal, according to exemplary embodiments of the disclosure.

As illustrated in FIG. 8, in some embodiments of the disclosure, determining whether the ultrasonic wake-up signal exists in the ultrasonic transmission signal may include the following.

At block S31, the ultrasonic transmission signal is converted into a wake-up digital signal through a first sampling rate. That is, the acoustic analog signal of the acoustic wave may be converted into a digital signal for detection and calculation.

The first sampling rate is a lower sampling rate and is a sampling rate less than or equal to 30000 Hz. The first sampling rate may be adjusted based on actual conditions, such as 8000 Hz or 16000 Hz. In the disclosure, the first sampling rate needs to be guaranteed to be higher than the frequency of the ultrasonic wake-up signal. The specific frequency of the first sampling rate is not specifically limited in the disclosure.

At block S32, it is determined whether the ultrasonic wake-up signal exists in the wake-up digital signal to determine whether the ultrasonic wake-up signal exists in the ultrasonic transmission signal.

In the application process, after the ultrasonic receiver receives the ultrasonic transmission signal from the ultrasonic transmitter, the ultrasonic transmission signal may be transmitted to a wake-up signal analog-to-digital converter for the conversion of the ultrasonic wake-up signal and to an ultrasonic signal analog-to-digital converter for the conversion of the ultrasonic signal.

The analog-to-digital converter may convert an analog signal into a digital signal. The wake-up signal analog-to-digital converter may employ the first sampling rate to convert the ultrasonic wake-up signal in the ultrasonic transmission signal from an analog signal to a digital signal, that is, the wake-up digital signal is obtained. Then, it is convenient to determine whether there is the ultrasonic wake-up signal in the wake-up digital signal, to determine whether the ultrasonic wake-up signal exists in the ultrasonic transmission signal.

Since the first sampling rate employed by the wake-up signal analog-to-digital converter is lower, for example, the first sampling rate FS may be 8000 Hz or 16000 Hz, which may ensure that the wake-up signal analog-to-digital converter consumes lower power. Even if the wake-up signal analog-to-digital converter is normally turning on, it may not bring a large power consumption burden to the entire ultrasonic receiver.

At the same time, since the first sampling rate employed by the wake-up signal analog-to-digital converter is lower, it may not accurately and completely sample the high-frequency ultrasonic encoded signal in the ultrasonic transmission signal, making it impossible to perform accurate decoding operations based on the digital signal obtained through the low sampling rate. Therefore, after it is determined that there is the wake-up signal in the wake-up digital signal converted through the low sampling rate, the acoustic analog signal is converted through the high sampling rate, and the transmission digital signal obtained through the high sampling rate may be decoded to obtain an accurate decoding result, so as to obtain the information transmitter by the transmitter.

As illustrated in FIG. 9, decoding the ultrasonic encoded signal in the ultrasonic transmission signal may include the following.

At block S41, the ultrasonic transmission signal is converted into a transmission digital signal through a second sampling rate.

The second sampling rate is a higher sampling rate. The second sampling rate is greater than the first sampling rate. The second sampling rate may be a sampling rate greater than or equal to 100000 Hz. The second sampling rate may be adjusted based on actual situation, such as 44100 Hz, 48000 Hz or 96000 Hz. In the disclosure, the second sampling rate needs to be higher than the corresponding highest possible frequency value of the ultrasonic encoded signal to ensure that the ultrasonic encoded signal may be accurately and completely sampled. The specific frequency of the second sampling rate is not limited in the disclosure.

At block S42, the transmission digital signal is decoded to obtain the transmission information.

In the application process, after the ultrasonic receiver receives the ultrasonic transmission signal from the ultrasonic transmitter, the ultrasonic transmission signal may be transmitted to the wake-up signal analog-to-digital converter and the ultrasonic signal analog-to-digital converter.

When the wake-up signal analog-to-digital converter receives the ultrasonic wake-up signal, and after subsequent determining, it is determined that there is the valid ultrasonic wake-up signal in the ultrasonic transmission signal, the ultrasonic signal analog-to-digital converter may respond to the ultrasonic wake-up signal and is activated to convert the received ultrasonic transmission signal into the transmission digital signal, which lays the foundation for the subsequent decoding of the encoded sub-signals based on the transmission digital signal.

The ultrasonic signal analog-to-digital converter may convert the ultrasonic transmission signal into the transmission digital signal through the second sampling rate. The second sampling rate is a higher sampling rate. For example, the second sampling rate FS may be 44100 Hz, 48000 Hz, 96000 Hz, or the like.

Because the ultrasonic signal analog-to-digital converter employs the higher sampling rate, it may ensure that the ultrasonic transmission signal may be completely received without missing the ultrasonic transmission signal. It may lay the foundation for the subsequent complete decoding of the ultrasonic encoded signal, and for obtaining complete transmission information.

Because the ultrasonic signal analog-to-digital converter employs the higher sampling rate, it may consume more power. Therefore, in order to ensure the long battery life of the ultrasonic receiver, the ultrasonic signal analog-to-digital converter may not be in the always-on state, but the ultrasonic signal analog-to-digital converter may be turned on to work as required, that is, when the ultrasonic wake-up signal is received.

Figure 10:
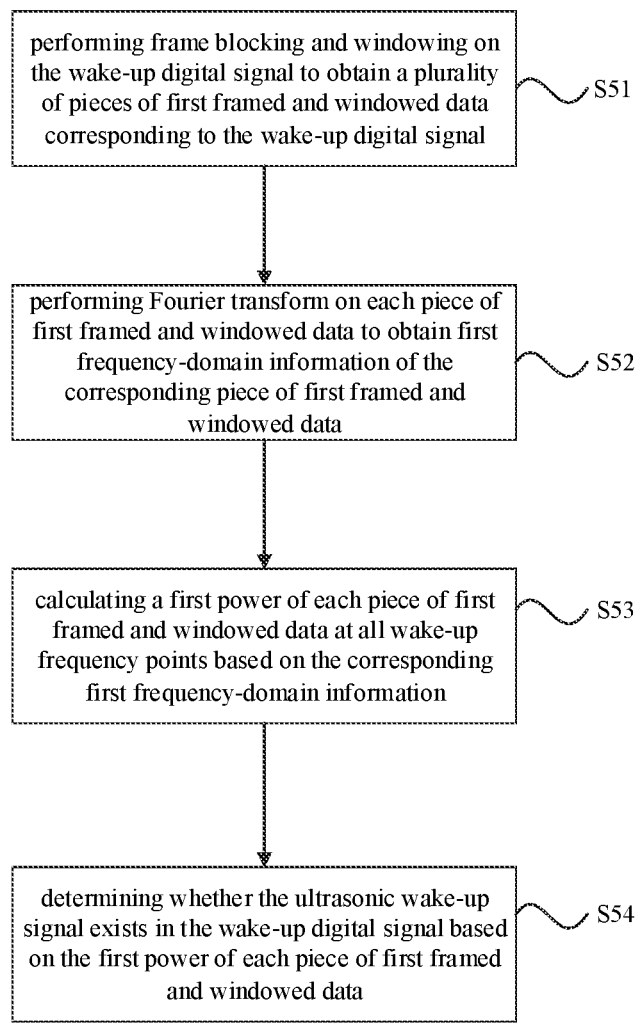
FIG. 10 is a flow chart of determining whether an ultrasonic wake-up signal exists in a wake-up digital signal in an information transmission method, according to exemplary embodiments of the disclosure.

FIG. 10 is a flow chart of determining whether an ultrasonic wake-up signal exists in a wake-up digital signal in an information transmission method, according to exemplary embodiments of the disclosure.

In some embodiments of the disclosure, the ultrasonic wake-up signal may include one or more ultrasonic signals with preset frequencies. The preset frequencies may be adjusted based on actual situations. In the disclosure, the preset frequencies may not be specifically limited.

As illustrated in FIG. 10, determining whether the ultrasonic wake-up signal exists in the wake-up digital signal may include the following.

At block S51, frame blocking and windowing is performed on the wake-up digital signal to obtain a plurality of pieces of first framed and windowed data corresponding to the wake-up digital signal.

At block S52, Fourier transform is performed on each piece of first framed and windowed data to obtain first frequency-domain information of the corresponding piece of first framed and windowed data.

At block S53, a first power of each piece of first framed and windowed data at all wake-up frequency points is calculated based on the corresponding first frequency-domain information.

All the wake-up frequency points are obtaining by Fourier transform based on a frequency of the ultrasonic wake-up signal.

At block S54, it is determined whether the ultrasonic wake-up signal exists in the wake-up digital signal based on the first power of each piece of first framed and windowed data.

In some embodiments, determining whether the ultrasonic wake-up signal exists in the wake-up digital signal may be realized by the following way.

The wake-up digital signal may be set as x(n), where n represents time series of the input signal after the sampling through the wake-up signal analog-to-digital converter, and the sampling rate is FS. FS may be 8000 Hz or 16000 hz.

x(n) may be divided into first framed data $x_1, x_2 \ldots x_k$ based on the frame length L through the framing and windowing, where k is a sequence number of frame.

Each framed data may be windowed to obtain framed and windowed data, that is, first framed and windowed data $x_{w1}, x_{w2} \ldots x_{wk}$. The first framed and windowed data may be determined by a formula of:

$$x_{wi} = \text{window}(x_i) \ (i=1,2 \ldots k)$$

where window represents a window function.

Fourier transform (FT) may be performed on the first framed and windowed data $x_{wi}$ after frame blocking and windowing to obtain the frequency-domain information of each frame of data signal, that is, the first frequency-domain information $X_1, X_2 \ldots X_k$. The first frequency-domain information may be determined by a formula of:

$$X_i = FT(x_{wi}) \ (i=1,2 \ldots k)$$

where if the number of points of Fourier transform is m, each $X_i$ may be decomposed into m corresponding frequency points.

Furthermore, based on the first frequency-domain information, an average power of each first framed and windowed data at all wake-up frequency points may be calculated. The wake-up frequency point b is a frequency of the ultrasonic wake-up signal with preset frequencies f (for example, 1 kHz, 2 KHz or 3 kHz) after the Fourier transform.

The wake-up frequency point b and the first power P may be determined by formulas of:

$$b = \text{round}\left(\frac{f*M}{FS}\right), \text{ and}$$

$$P = \text{mod}(X_i(b)).$$

In some embodiments, if the preset frequency f of the ultrasonic wake-up signal is 1 kHz, the number M of points of Fourier transform is 128, and the sampling rate FS of the wake-up signal analog-to-digital converter is 16000, b=round (1000*128/16000)=8.

If $X_i$ (8) has a value of 0.025+0.012i, the first power P=mod (0.025+0.012i)=0.0277.

Furthermore, it is determined whether the ultrasonic wake-up signal exists in the ultrasonic transmission signal based on the first power P of the first framed and windowed data.

It is determined whether all the first power P calculated above is greater than or equal to a first power threshold Q. If all the first power P is greater than or equal to the first power threshold Q, it means that this frame of signal includes the ultrasonic wake-up signal, that is, the ultrasonic wake-up signal exists in the ultrasonic transmission signal. If the first power P is less than the first power threshold Q, it means that this frame of signal does not include the ultrasonic wake-up signal, that is, the ultrasonic wake-up signal does not exist in the ultrasonic transmission signal.

The first power threshold Q may be adjusted based on actual situations. The first power threshold Q may not be specifically limited in the disclosure.

In order to ensure the accuracy of determining whether the ultrasonic wake-up signal exists in the ultrasonic transmission signal based on the first power P of the first framed and windowed data, as a deformation, it may be determined for continuous k frames (where k is the anti-noise coefficient), that is, whether all the first power P calculated in each frame signal is greater than or equal to the first power threshold Q. If all the first power P is greater than or equal to the first power threshold Q, there is the ultrasonic wake-up signal in the ultrasonic transmission signal.

In some embodiments of the disclosure, the ultrasonic encoded signal may include a plurality of encoded sub-signals arranged in sequence.

Decoding the transmission digital signal to obtain the transmission information may be realized by the following way.

The plurality of encoded sub-signals may be sequentially decoded to obtain a plurality of characters corresponding to the plurality of encoded sub-signals.

The plurality of characters may be formed into the transmission information in sequence.

The decoding sequence of the ultrasonic encoded signal starts from the first encoded sub-signal of the ultrasonic encoded signal and ends at the last encoded sub-signal of the ultrasonic encoded signal. The first encoded sub-signal corresponds to the first character in the transmission information, and the last encoded sub-signal corresponds to the last character in the transmission information. Therefore, in the application, the plurality of encoded sub-signals may be decoded in chronological order, that is, the plurality of encoded sub-signals may be decoded into the plurality of characters in turn, and the plurality of decoded characters may be arranged in the order of decoding to form the transmission information.

Figure 11:
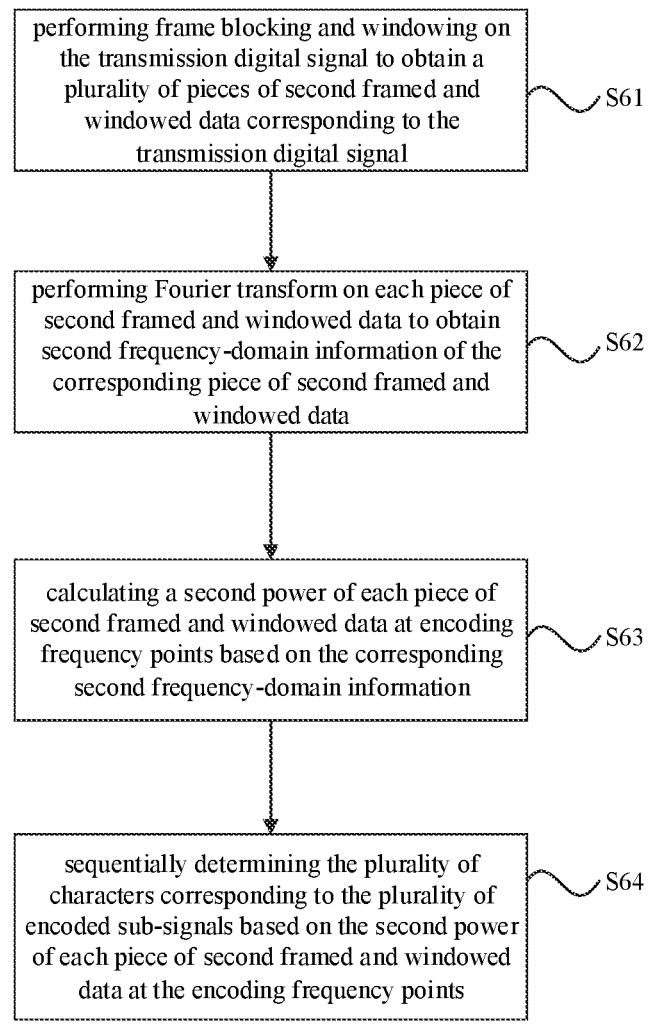
FIG. 11 is a flow chart of sequentially decoding a plurality of encoded sub-signals in an information transmission method, according to exemplary embodiments of the disclosure.

FIG. 11 is a flow chart of sequentially decoding a plurality of encoded sub-signals in an information transmission method, according to exemplary embodiments of the disclosure.

As illustrated in FIG. 11, sequentially decoding the plurality of encoded sub-signals may include the following.

At block S61, frame blocking and windowing is performed on the transmission digital signal to obtain a plurality of pieces of second framed and windowed data corresponding to the transmission digital signal.

At block S62, Fourier transform is performed on each piece of second framed and windowed data to obtain second frequency-domain information of the corresponding piece of second framed and windowed data.

At block S63, a second power of each piece of second framed and windowed data at encoding frequency points is calculated based on the corresponding second frequency-domain information.

The encoding frequency points are obtaining by Fourier transform based on frequencies corresponding to the plurality of characters.

At block S64, the plurality of characters corresponding to the plurality of encoded sub-signals are sequentially determined based on the second power of each piece of second framed and windowed data at the encoding frequency points.

The transmission digital signal may be set as y(n), where n represents time series of the input signal after the sampling through the ultrasonic signal analog-to-digital converter, and the sampling rate is FS. FS may be 8000 Hz or 16000 hz.

y(n) may be divided into second framed data $y_1, y_2 \ldots y_k$ based on the frame length L through the framing and windowing, where k is a sequence number of frame.

Each framed data may be windowed to obtain framed and windowed data, that is, second framed and windowed data $y_{w1}, y_{w2} \ldots y_{wk}$. The second framed and windowed data may be determined by a formula of:

$$y_{wi} = \text{window}(y_i) \ (i=1,2 \ldots k)$$

where window represents a window function.

Fourier transform (FT) may be performed on the second framed and windowed data $y_{wi}$ after frame blocking and windowing to obtain the frequency-domain information of each frame of data signal, that is, the second frequency-domain information $Y_1, Y_2 \ldots Y_k$. The second frequency-domain information may be determined by a formula of:

$$Y_i = FT(y_{wi}) \ (i=1,2 \ldots k)$$

where if the number of points of Fourier transform is m, each $Y_i$ may be decomposed into m corresponding frequency points.

Furthermore, based on the second frequency-domain information, an average power of each second framed and windowed data at all encoding frequency points may be calculated. The encoding frequency point b' is obtained after the frequency f (for example, 19 khz, 20 kHz, 21 khz, 22 khz or 23 khz) corresponding to the character is performed with the Fourier transform.

The encoding frequency point b' and the second power P' may be determined by formulas of:

$$b' = \text{round}\left(\frac{f*M}{FS}\right), \text{ and}$$

$$P' = \text{mod}(Y_i(b')),$$

In some embodiments, the frequency f in the character frequency correspondence table may be selected as 19 kHz, the number M of points of Fourier transform is 128, and the sampling rate FS of the ultrasonic signal analog-to-digital converter is 16000, b'=round (19000*128/16000)=152.

If $Y_i$ (152) has a value of 0.225+0.108i, the second power P'=mod (0.225+0.108i)=0.2493.

Furthermore, based on the second power P' of the encoding frequency point of the second framed and windowed data, the plurality of characters corresponding to the plurality of encoded sub-signals may be sequentially determined.

It is determined whether all the second power P' calculated above is greater than or equal to a second power threshold Q'. If all the second power P' is greater than or equal to the second power threshold Q', and greater than the second power calculated based on other frequencies (20 kHz, 21 kHz, 22 kHz, and 23 kHz) except for the frequency (19 kHz) in the character frequency correspondence table, it means that the ultrasonic transmission signal includes the encoded sub-signal corresponding to the frequency (19 kHz).

In order to ensure the accuracy of determining whether the ultrasonic transmission signal includes the encoded sub-signal corresponding to the frequency based on the second power P' of the second framed and windowed data, as a deformation, it may be determined for continuous k frames (where k is the anti-noise coefficient). If the second power P' calculated based on a certain frequency in the character frequency correspondence table for continuous k frames all greater than or equal to the second power threshold Q', and greater than the second power calculated based on other frequencies except for this frequency in the character frequency correspondence table, it means that the ultrasonic transmission signal includes the encoded sub-signal corresponding to the frequency.

Furthermore, based on the encoded sub-signal having a specific frequency obtained by decoding and the character frequency correspondence table, the character corresponding to the specific frequency is obtained.

In some embodiments, in the character frequency correspondence table, character 1 corresponds to a specific frequency of 19 kHz; character 2 corresponds to a specific frequency of 20 kHz; character 3 corresponds to a specific frequency of 21 kHz; character 4 corresponds to a specific frequency of 22 kHz; and character 5 corresponds to a specific frequency of 23 kHz. The frequency of the encoded sub-signal obtained by decoding is 19 kHz, the character corresponding to the encoded sub-signal is 1.

The plurality of encoded sub-signals may be sequentially decoded to obtain the plurality of characters corresponding to the plurality of encoded sub-signals; and the plurality of characters may be arranged in order to form the transmission information.

In some embodiments of the disclosure, the transmission information is data or an instruction. The information transmission method further includes: storing the data or executing the instruction based on the decoded transmission information.

The data may be text, picture or other content. The ultrasonic receiver receives and decodes it in the above manner, and then it may be stored, such as stored locally or sent to cloud storage. The executed instruction may be launching a specific software or application; or launching a specific page; or launching a payment interface and performing payment operations; or returning specific information to the ultrasonic transmitter in the form of ultrasonic waves; or connecting the corresponding Wi-Fi or Bluetooth device based on the Wi-Fi or Bluetooth password information contained in the transmission information and performing next information transmission work; or the like.

Figure 12:
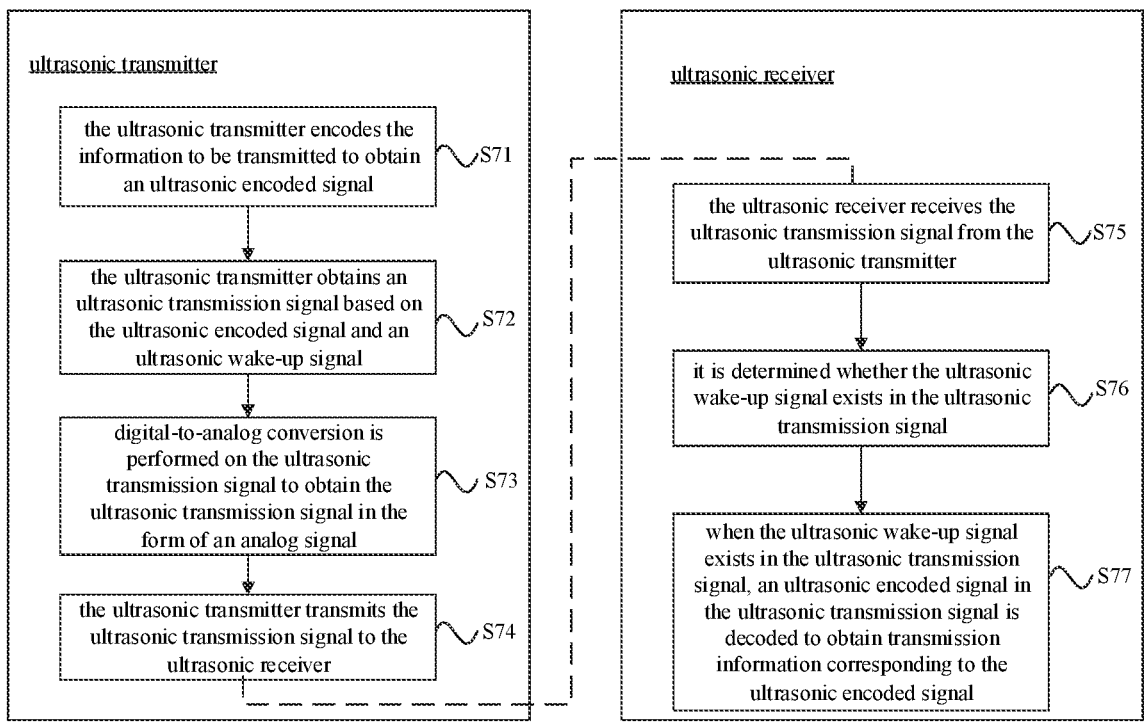
FIG. 12 is an interaction diagram of an information transmission method, according to exemplary embodiments of the disclosure.

FIG. 12 is an interaction diagram of an information transmission method, according to exemplary embodiments of the disclosure.

As illustrated in FIG. 12, in some embodiments of the disclosure, the interaction process of the information transmission method may include the following.

At block S71, the ultrasonic transmitter encodes the information to be transmitted to obtain an ultrasonic encoded signal.

The information to be transmitted may include a plurality of characters arranged in sequence. For example, the information to be transmitted is "12345".

The character frequency correspondence table is preset in advance, for example, character 1 corresponds to a frequency of 19 kHz; character 2 corresponds to a frequency of 20 kHz; character 3 corresponds to a frequency of 21 kHz; character 4 corresponds to a frequency of 22 kHz; character 5 corresponds to a frequency of 23 kHz.

Based on the character frequency correspondence table, the information to be transmitted "12345" may be converted into a signal in the form of ultrasonic waves based on frequencies 19 kHz, 20 kHz, 21 kHz, 22 kHz, and 23 kHz, that is, the ultrasonic encoded signal.

At block S72, the ultrasonic transmitter obtains an ultrasonic transmission signal based on the ultrasonic encoded signal and an ultrasonic wake-up signal.

The ultrasonic wake-up signal is configured to wake up an ultrasonic receiver to decode the ultrasonic encoded signal.

In some embodiments, a blank signal is inserted between the ultrasonic wake-up signal and the ultrasonic encoded signal. The ultrasonic wake-up signal, the blank signal, and the ultrasonic encoded signal may be spliced sequentially to obtain the ultrasonic transmission signal. The signal length of the ultrasonic transmission signal is the sum of the signal lengths of the ultrasonic wake-up signal, the blank signal, and the ultrasonic encoded signal.

In some embodiments, the ultrasonic wake-up signal and the ultrasonic encoded signal may be superimposed and combined to obtain the ultrasonic transmission signal. The signal length of the ultrasonic transmission signal is determined based on the longer signal length between the ultrasonic wake-up signal and the ultrasonic encoded signal.

At block S73, digital-to-analog conversion is performed on the ultrasonic transmission signal to obtain the ultrasonic transmission signal in the form of an analog signal.

In some embodiments, the digital-to-analog converter may be configured to convert the ultrasonic transmission signal from a digital signal form to an analog signal form. The ultrasonic transmission signal in the form of the analog signal may facilitate the transmission of the ultrasonic transmission signal from the ultrasonic transmitter to the ultrasonic receiver on the premise of ensuring the integrity of the signal.

At block S74, the ultrasonic transmitter transmits the ultrasonic transmission signal to the ultrasonic receiver.

The ultrasonic transmission signal may be the ultrasonic transmission signal after digital-to-analog conversion processing.

At block S75, the ultrasonic receiver receives the ultrasonic transmission signal from the ultrasonic transmitter.

The transmission signal received by the ultrasonic receiver is the ultrasonic transmission signal after digital-to-analog conversion processing.

After receiving the ultrasonic transmission signal, the ultrasonic receiver transmits the ultrasonic transmission signal to the wake-up signal analog-to-digital converter that performs analog-to-digital conversion on the ultrasonic wake-up signal and the ultrasonic signal analog-to-digital converter that performs analog-to-digital conversion on the ultrasonic signal.

At block S76, it is determined whether the ultrasonic wake-up signal exists in the ultrasonic transmission signal.

At block S77, when the ultrasonic wake-up signal exists in the ultrasonic transmission signal, an ultrasonic encoded signal in the ultrasonic transmission signal is decoded to obtain transmission information corresponding to the ultrasonic encoded signal, that is, the information to be transmitted from the ultrasonic transmitter.

Analog-to-digital conversion may be performed on the ultrasonic transmission signal.

When the wake-up signal analog-to-digital converter receives the ultrasonic wake-up signal, and after subsequent determining, it is determined that there is the valid ultrasonic wake-up signal in the ultrasonic transmission signal, the ultrasonic signal analog-to-digital converter may respond to the ultrasonic wake-up signal and is activated to convert the received ultrasonic transmission signal into the transmission digital signal, which lays the foundation for the subsequent decoding of the encoded sub-signals based on the transmission digital signal.

Based on the ultrasonic transmission signal after the analog-to-digital conversion processing, the ultrasonic receiver decodes the ultrasonic encoded signal in the ultrasonic transmission signal, and obtains the transmission information corresponding to the ultrasonic encoded signal.

Through the foregoing implementation manners, it may be ensured that the decoding device in the ultrasonic receiver may not have to be working all the time on the premise that the ultrasonic receiver may decode in time, thereby reducing the power consumption of the ultrasonic receiver, and improving the user experience.

Figure 13:
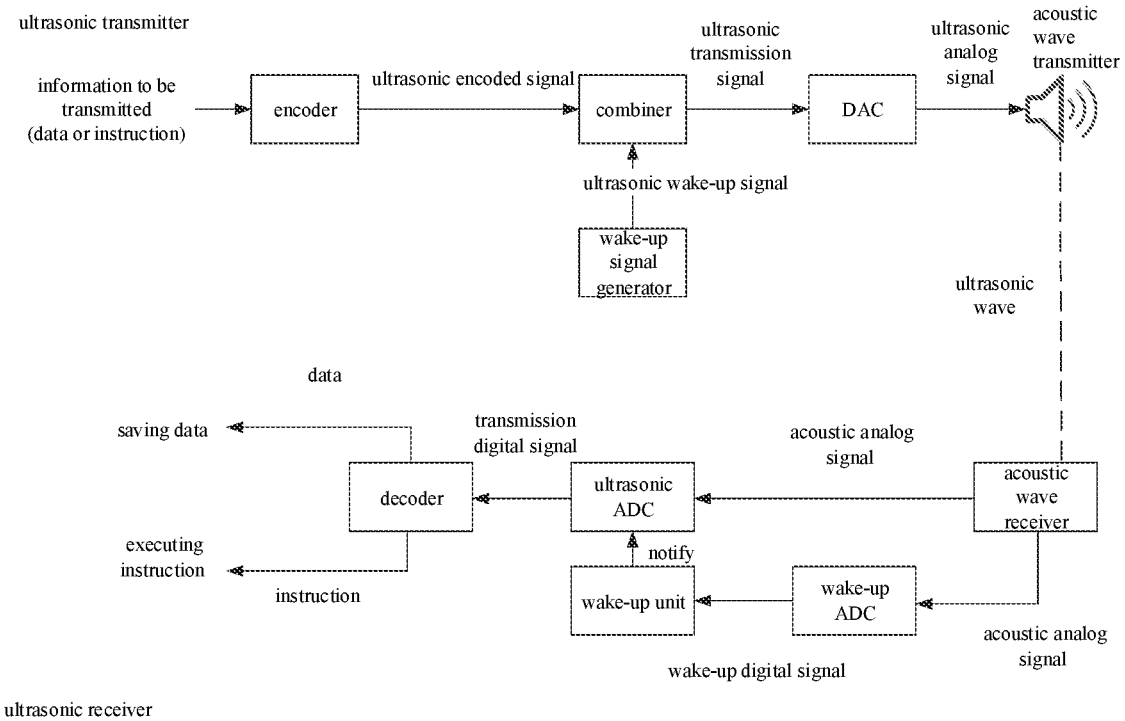
FIG. 13 is a schematic diagram of an ultrasonic transmitter and an ultrasonic receiver, according to exemplary embodiments of the disclosure.

FIG. 13 illustrates an example of an exemplary ultrasonic transmitter and ultrasonic receiver. The information transmission method may be illustrated and described in combination with the ultrasonic transmitter and ultrasonic receiver.

As illustrated in FIG. 13, the ultrasonic transmitter may include an encoder, a wake-up signal generator, a combiner, a digital-to-analog converter (DAC), and an acoustic wave transmitter. The encoder may encode the information to be transmitted to obtain the ultrasonic encoded signal. The wake-up signal generator may generate the ultrasonic wake-up signal based on preset frequencies or specified information. The combiner combines the ultrasonic encoded signal and the ultrasonic wake-up signal to obtain the ultrasonic transmission signal. DAC may convert the ultrasonic transmission signal from a digital signal into an ultrasonic analog signal. The acoustic wave transmitter may transmit the information to be transmitted the form of ultrasonic wave according to the ultrasonic analog signal.

The ultrasonic receiver may include an acoustic wave receiver, a wake-up analog-to-digital converter (ADC), a wake-up unit, an ultrasonic analog-to-digital converter, and a decoder. The acoustic wave receiver may receive the acoustic analog signal in the form of the ultrasonic wave. The wake-up ADC may sample the acoustic analog signal at a low sampling rate and may convert it into a wake-up digital signal in the form of a digital signal. The wake-up unit may judge the wake-up digital signal and determine whether there is the ultrasonic wake-up signal. If there is the ultrasonic wake-up signal, it may notify the ultrasonic ADC. The ultrasonic ADC may sample the acoustic analog signal received by the acoustic wave receiver at a high sampling rate to obtain the transmission digital signal. The decoder may decode the encoded sub-signals in the transmission digital signal to obtain the information transmitted from the ultrasonic transmitter. Finally, the ultrasonic receiver may perform corresponding operations according to the content included in the information. If data is included, it may be saved. If an instruction is included, the instruction may be executed.

Based on the same concept, embodiments of the disclosure further provide an information transmission apparatus.

It may be understood that, in order to realize the above-mentioned functions, the information transmission apparatus provided in the embodiments of the disclosure may include hardware structures and/or software modules corresponding to each function. In combination with the units and algorithm actions of the examples disclosed in the embodiments of the disclosure, the embodiments of the disclosure may be implemented in the form of hardware or a combination of hardware and computer software. Whether a certain function is executed by hardware or by driving the hardware through the computer software, depends on the specific application and design constraint conditions. Those skilled in the art may employ different methods for each specific application to implement the described functions, but such implementation should not be considered as going beyond the scope of the technical solutions of the embodiments of the disclosure.

Figure 14:
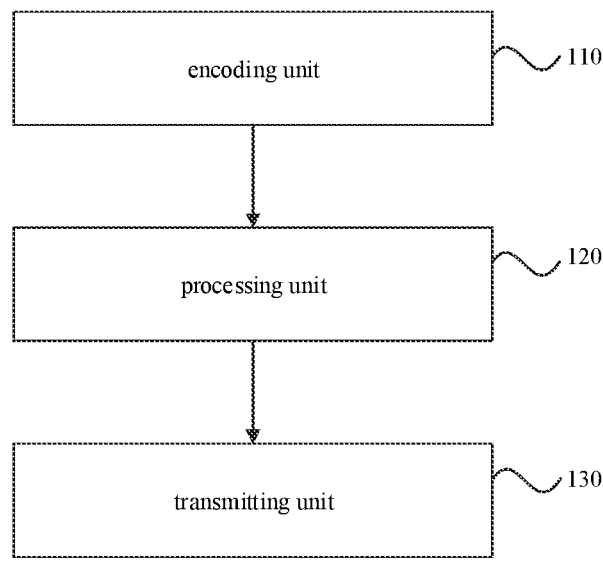
FIG. 14 is a block diagram of an information transmission apparatus, according to exemplary embodiments of the disclosure.

FIG. 14 is a block diagram of an information transmission apparatus, according to exemplary embodiments of the disclosure.

As illustrated in FIG. 14, in some embodiments of the disclosure, the information transmission apparatus is applicable to an ultrasonic transmitter. The information transmission apparatus may include an encoding unit 110, a processing unit 120, and a transmitting unit 130.

The encoding unit 110 is configured to encode information to be transmitted to obtain an ultrasonic encoded signal.

The processing unit 120 is configured to obtain an ultrasonic transmission signal based on the ultrasonic encoded signal and an ultrasonic wake-up signal, the ultrasonic wake-up signal for waking up an ultrasonic receiver to decode the ultrasonic encoded signal.

The transmitting unit 130 is configured to transmit the ultrasonic transmission signal to the ultrasonic receiver.

In some embodiments, a frequency of the ultrasonic encoded signal is within a first frequency band; and a frequency of the ultrasonic wake-up signal is within a second frequency band; in which, the first frequency band is different from the second frequency band.

In some embodiments, the information to be transmitted includes a plurality of characters arranged in sequence. The encoding unit 110 is configured to: sequentially convert the plurality of characters into a plurality of frequency values based on a correspondence between characters and frequency values; obtain a plurality of encoded sub-signals corresponding to the plurality of characters based on the plurality of frequency values; and sequentially encode the plurality of encoded sub-signals corresponding to the plurality of characters to form the ultrasonic encoded signal.

In some embodiments, the encoding unit 110 is configured to: sequentially convert the plurality of characters into a plurality of numbers based on a correspondence between characters and numbers; and sequentially convert the plurality of numbers into the plurality of frequency values based on a correspondence between numbers and frequency values.

In some embodiments, the encoding unit 110 is configured to: when frequencies of adjacent encoded sub-signals are the same, directly connect the adjacent encoded sub-signals; and when frequencies of adjacent encoded sub-signals are different, connect the adjacent encoded sub-signals through frequency shifting.

In some embodiments, the encoding unit 110 is configured to: add a fade-in before an encoded sub-signal corresponding to a first character, and add a fade-out after an encoded sub-signal corresponding to a last character, to form the ultrasonic encoded signal.

In some embodiments, the processing unit 120 is configured to: generate the ultrasonic wake-up signal.

In some embodiments, the processing unit 120 is configured to: obtain the ultrasonic wake-up signal through combinatorial encoding on one or more preset frequencies.

In some embodiments, the processing unit 120 is configured to: convert designated information to obtain designated frequency information based on the designated information; and perform combinatorial encoding on the designated frequency information to obtain the ultrasonic wake-up signal based on the designated frequency information.

In some embodiments, the processing unit 120 is configured to: obtain the designated information, in which the designated information includes at least one of the following: one or more sinusoidal frequency signals, designated text information, or one or more designated audio signals.

In some embodiments, the processing unit 120 is configured to: perform combinatorial encoding on the ultrasonic encoded signal and the ultrasonic wake-up signal to obtain the ultrasonic transmission signal.

In some embodiments, the processing unit 120 is configured to: sequentially splice the ultrasonic wake-up signal, a blank signal, and the ultrasonic encoded signal to obtain the ultrasonic transmission signal.

In some embodiments, the processing unit 120 is configured to: superimpose and combine the ultrasonic wake-up signal and the ultrasonic encoded signal to obtain the ultrasonic transmission signal.

In some embodiments, the transmitting unit 130 is configured to: transmit the ultrasonic transmission signal to the ultrasonic receiver at a preset interval, in which the ultrasonic transmission signal is a signal processed by digital-to-analog conversion.

Based on the same concept, embodiments of the disclosure further provide another information transmission apparatus.

Figure 15:
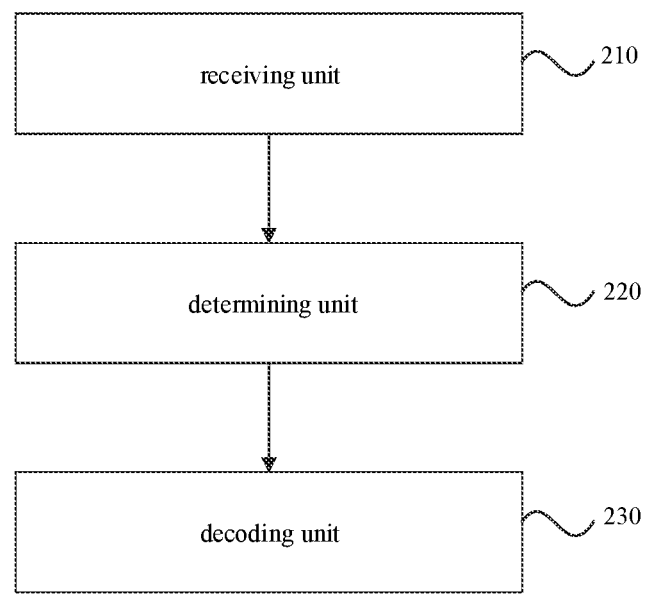
FIG. 15 is a block diagram of an information transmission apparatus, according to exemplary embodiments of the disclosure.

FIG. 15 is a block diagram of an information transmission apparatus, according to exemplary embodiments of the disclosure.

As illustrated in FIG. 15, in some embodiments of the disclosure, the information transmission apparatus is applicable to an ultrasonic receiver. The information transmission apparatus may include a receiving unit 210, a determining unit 220, and a decoding unit 230.

The receiving unit 210 is configured to receive an ultrasonic transmission signal from an ultrasonic transmitter.

The determining unit 220 is configured to determine whether an ultrasonic wake-up signal exists in the ultrasonic transmission signal.

The decoding unit 230 is configured to, when the ultrasonic wake-up signal exists in the ultrasonic transmission signal, decode an ultrasonic encoded signal in the ultrasonic transmission signal to obtain transmission information corresponding to the ultrasonic encoded signal.

In some embodiments, the determining unit 220 is configured to: convert the ultrasonic transmission signal into a wake-up digital signal through a first sampling rate; and determine whether the ultrasonic wake-up signal exists in the wake-up digital signal to determine whether the ultrasonic wake-up signal exists in the ultrasonic transmission signal; the decoding unit is configured to, convert the ultrasonic transmission signal into a transmission digital signal through a second sampling rate; and decode the transmission digital signal to obtain the transmission information; in which, the second sampling rate is higher than the first sampling rate.

In some embodiments, the determining unit 220 is configured to: perform frame blocking and windowing on the wake-up digital signal to obtain a plurality of pieces of first framed and windowed data corresponding to the wake-up digital signal; perform Fourier transform on each piece of first framed and windowed data to obtain first frequency-domain information of the corresponding piece of first framed and windowed data; calculate a first power of each piece of first framed and windowed data at all wake-up frequency points based on the corresponding first frequency-domain information, in which all the wake-up frequency points are obtaining by Fourier transform based on a frequency of the ultrasonic wake-up signal; and determine whether the ultrasonic wake-up signal exists in the wake-up digital signal based on the first power of each piece of first framed and windowed data.

In some embodiments, the ultrasonic encoded signal includes a plurality of encoded sub-signals arranged in sequence. The decoding unit 230 is configured to: sequentially decode the plurality of encoded sub-signals to obtain a plurality of characters corresponding to the plurality of encoded sub-signals; and form the plurality of characters into the transmission information in sequence.

In some embodiments, the decoding unit 230 is configured to: perform frame blocking and windowing on the transmission digital signal to obtain a plurality of pieces of second framed and windowed data corresponding to the transmission digital signal; perform Fourier transform on each piece of second framed and windowed data to obtain second frequency-domain information of the corresponding piece of second framed and windowed data; calculate a second power of each piece of second framed and windowed data at encoding frequency points based on the corresponding second frequency-domain information, in which the encoding frequency points are obtaining by Fourier transform based on frequencies corresponding to the plurality of characters; and sequentially determine the plurality of characters corresponding to the plurality of encoded sub-signals based on the second power of each piece of second framed and windowed data at the encoding frequency points.

In some embodiments, the transmission information is data or an instruction, and the apparatus further includes: an executing unit configured to store the data or execute the instruction based on the decoded transmission information.

Figure 16:
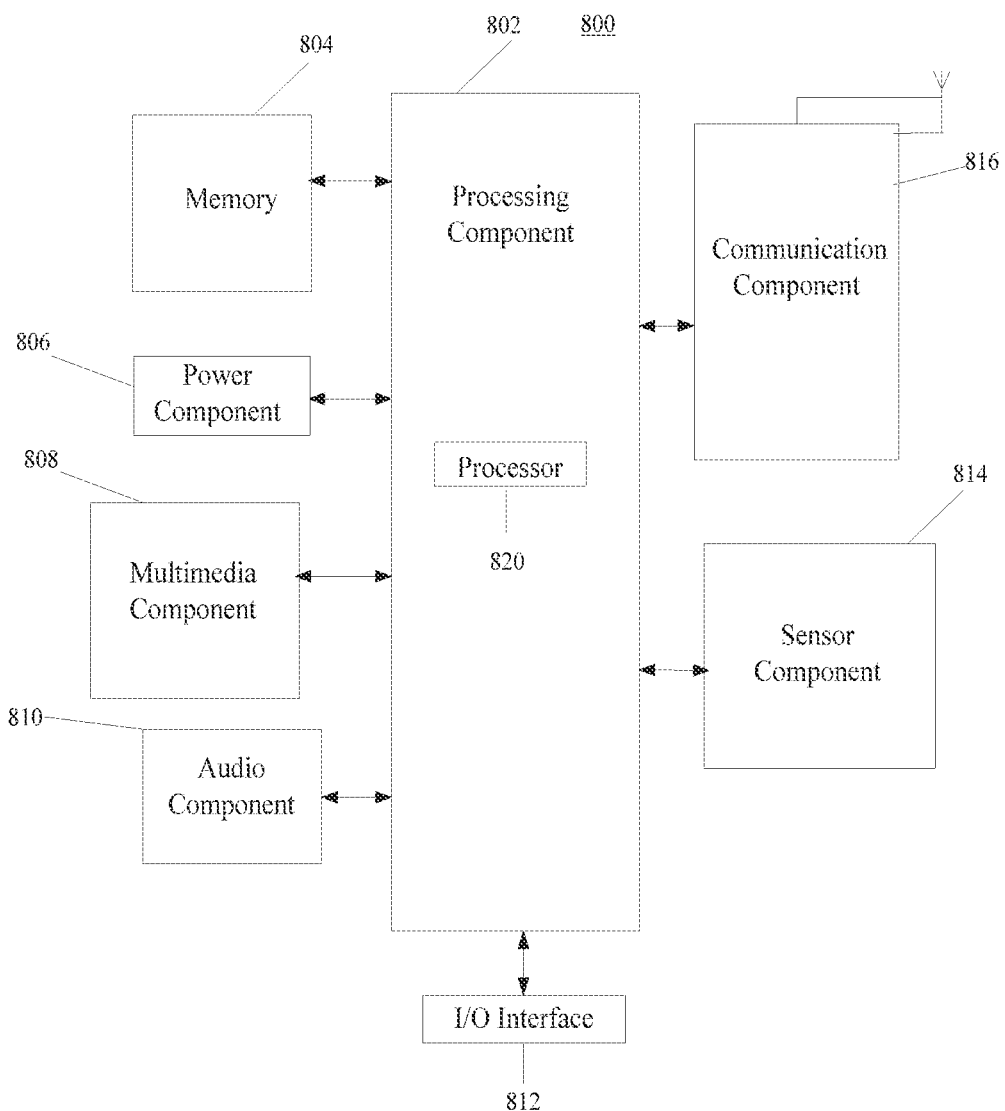
FIG. 16 is a block diagram of an information transmission device, according to exemplary embodiments of the disclosure.

FIG. 16 is a block diagram of an information transmission device, according to exemplary embodiments of the disclosure. For example, the device 800 may be a mobile phone, a computer, a digital broadcast terminal, a messaging device, a gaming console, a tablet, a medical device, exercise equipment, a personal digital assistant, and the like.

Referring to FIG. 16, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

Figure 17:
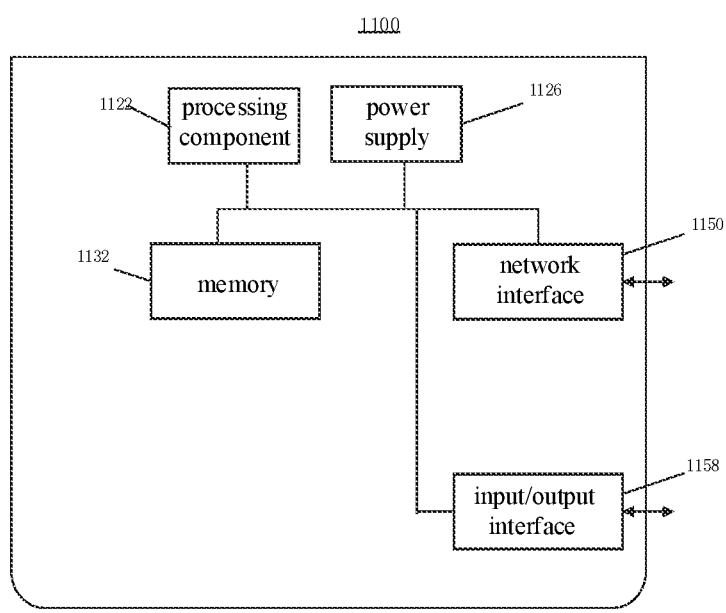
FIG. 17 is a block diagram of an information transmission device, according to exemplary embodiments of the disclosure.

FIG. 17 is a block diagram of an information transmission device, according to exemplary embodiments of the disclosure. For example, the device 1100 may be a server. Referring to FIG. 17, the device 1100 may include a processing component 1122 (which may further include one or more processors) and memory resources represented by a memory 1132 for storing instructions that may be executed by the processing component 1122, such as application programs. The application programs stored in the medium 1132 may include one or more modules. Each module may include a set of instructions. Further, the processing component 1122 may be configured to execute the instructions and perform any above method.

The device 1100 may also include a power supply 1126 configured to perform power management of the device 1100, a wired or wireless network interface 1150 configured to connect the device to the network, and an input/output interface 1158. The device may operate based on an operating system stored in the memory 1132, such as Windows Server™, Mac OS X™, Unix™, Linux™, FreeBSD™, or the like.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship. The singular forms "a", "said" and "the" are also intended to include plural forms, unless the context clearly indicates other meanings.

It may be further understood that the terms "first" and "second" are used to describe various information, but this various information should not be limited to these terms. These terms are only used to distinguish the same type of information from each other, and do not indicate a specific order or degree of importance. In fact, expressions such as "first" and "second" may be interchangeably. For example, without departing from the scope of the disclosure, the first information may also be referred to as the second information, and similarly, the second information may also be referred to as the first information.

It may be further understood that, unless otherwise specified, "connected" includes a direct connection between the two without other components, and also includes an indirect connection between the two with other elements.

It may be further understood that although the operations in the embodiments of the disclosure are described in a specific order in the drawings, they should not be understood as requiring these operations to be performed in the specific order shown or in a serial order, or requiring performing all the operations shown to get the desired result. In certain circumstances, multitasking and parallel processing may be advantageous.

Other embodiments of the invention will be apparent to those skilled in the art from consideration of the specification and practice of the invention disclosed here. This application is intended to cover any variations, uses, or adaptations of the invention following the general principles thereof and including such departures from the disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An information transmission method for an ultrasonic transmitter, comprising:
   encoding information to be transmitted to obtain an ultrasonic encoded signal;
   obtaining an ultrasonic transmission signal based on the ultrasonic encoded signal and an ultrasonic wake-up signal, the ultrasonic wake-up signal for waking up an ultrasonic receiver to decode the ultrasonic encoded signal; and
   transmitting the ultrasonic transmission signal to the ultrasonic receiver,.
   wherein,
   the information to be transmitted comprises a plurality of characters arranged in sequence;
   encoding the information to be transmitted to obtain the ultrasonic encoded signal comprises:
      sequentially converting the plurality of characters into a plurality of frequency values based on a correspondence between characters and frequency values;

obtaining a plurality of encoded sub-signals corresponding to the plurality of characters based on the plurality of frequency values; and
sequentially encoding the plurality of encoded sub-signals corresponding to the plurality of characters to form the ultrasonic encoded signal.

2. The method of claim 1, wherein,
a frequency of the ultrasonic encoded signal is within a first frequency band; and
a frequency of the ultrasonic wake-up signal is within a second frequency band;
in which, the first frequency band is different from the second frequency band.

3. The method of claim 1, wherein sequentially converting the plurality of characters into the plurality of frequency values based on the correspondence between characters and frequency values comprises:
sequentially converting the plurality of characters into a plurality of numbers based on a correspondence between characters and numbers; and
sequentially converting the plurality of numbers into the plurality of frequency values based on a correspondence between numbers and frequency values.

4. The method of claim 1, wherein sequentially encoding the plurality of encoded sub-signals corresponding to the plurality of characters to form the ultrasonic encoded signal comprises:
when frequencies of adjacent encoded sub-signals are the same, directly connecting the adjacent encoded sub-signals; and
when frequencies of adjacent encoded sub-signals are different, connecting the adjacent encoded sub-signals through frequency shifting.

5. The method of claim 4, wherein sequentially encoding the plurality of encoded sub-signals corresponding to the plurality of characters to form the ultrasonic encoded signal comprises:
adding a fade-in before an encoded sub-signal corresponding to a first character, and adding a fade-out after an encoded sub-signal corresponding to a last character, to form the ultrasonic encoded signal, wherein a fade-in is a signal which has the same frequency value with a sub-signal following the fade-in, and the fade-out is a signal which has the same frequency value with a sub-signal previous the fade-out.

6. The method of claim 1, wherein before obtaining the ultrasonic transmission signal based on the ultrasonic encoded signal and the ultrasonic wake-up signal, the method further comprises:
generating the ultrasonic wake-up signal.

7. The method of claim 6, wherein generating the ultrasonic wake-up signal comprises:
obtaining the ultrasonic wake-up signal through combinatorial encoding on one or more preset frequencies.

8. The method of claim 6, wherein generating the ultrasonic wake-up signal comprises:
converting designated information to obtain designated frequency information based on the designated information; and
performing combinatorial encoding on the designated frequency information to obtain the ultrasonic wake-up signal based on the designated frequency information.

9. The method of claim 8, wherein before generating the ultrasonic wake-up signal, the method further comprises:
obtaining the designated information, in which the designated information comprises at least one of the following: one or more sinusoidal frequency signals, designated text information, or one or more designated audio signals.

10. The method of claim 6, wherein obtaining the ultrasonic transmission signal based on the ultrasonic encoded signal and the ultrasonic wake-up signal comprises:
performing combinatorial encoding on the ultrasonic encoded signal and the ultrasonic wake-up signal to obtain the ultrasonic transmission signal.

11. The method of claim 10, wherein performing combinatorial encoding on the ultrasonic encoded signal and the ultrasonic wake-up signal to obtain the ultrasonic transmission signal comprises:
sequentially splicing the ultrasonic wake-up signal, a blank signal, and the ultrasonic encoded signal to obtain the ultrasonic transmission signal.

12. The method of claim 10, wherein performing combinatorial encoding on the ultrasonic encoded signal and the ultrasonic wake-up signal to obtain the ultrasonic transmission signal comprises:
superimposing and combining the ultrasonic wake-up signal and the ultrasonic encoded signal to obtain the ultrasonic transmission signal.

13. The method of claim 1, wherein transmitting the ultrasonic transmission signal to the ultrasonic receiver comprises:
transmitting the ultrasonic transmission signal to the ultrasonic receiver at a preset interval, in which the ultrasonic transmission signal is a signal processed by digital-to-analog conversion.

14. An information transmission method for an ultrasonic receiver, comprising:
receiving an ultrasonic transmission signal from an ultrasonic transmitter;
determining whether an ultrasonic wake-up signal exists in the ultrasonic transmission signal; and
when the ultrasonic wake-up signal exists in the ultrasonic transmission signal, decoding an ultrasonic encoded signal in the ultrasonic transmission signal to obtain transmission information corresponding to the ultrasonic encoded signal,
wherein,
determining whether the ultrasonic wake-up signal exists in the ultrasonic transmission signal comprises: converting the ultrasonic transmission signal into a wake-up digital signal through a first sampling rate; and determining whether the ultrasonic wake-up signal exists in the wake-up digital signal to determine whether the ultrasonic wake-up signal exists in the ultrasonic transmission signal; and
decoding the ultrasonic encoded signal in the ultrasonic transmission signal to obtain the transmission information corresponding to the ultrasonic encoded signal comprises: converting the ultrasonic transmission signal into a transmission digital signal through a second sampling rate;
and decoding the transmission digital signal to obtain the transmission information;
in which, the second sampling rate is higher than the first sampling rate.

15. The method of claim 14, wherein determining whether the ultrasonic wake-up signal exists in the wake-up digital signal comprises:
performing frame blocking and windowing on the wake-up digital signal to obtain a plurality of pieces of first framed and windowed data corresponding to the wake-up digital signal;

performing Fourier transform on each piece of first framed and windowed data to obtain first frequency-domain information of a corresponding piece of first framed and windowed data;

calculating a first power of each piece of first framed and windowed data at all wake-up frequency points based on the corresponding first frequency-domain information, in which all the wake-up frequency points are obtaining by Fourier transform based on a frequency of the ultrasonic wake-up signal; and determining whether the ultrasonic wake-up signal exists in the wake-up digital signal based on the first power of each piece of first framed and windowed data.

16. The method of claim 14, wherein, the ultrasonic encoded signal comprises a plurality of encoded sub-signals arranged in sequence;

decoding the transmission digital signal to obtain the transmission information comprises:
sequentially decoding the plurality of encoded sub-signals to obtain a plurality of characters corresponding to the plurality of encoded sub-signals; and
forming the plurality of characters into the transmission information in sequence.

17. The method of claim 16, wherein sequentially decoding the plurality of encoded sub-signals to obtain the plurality of characters corresponding to the plurality of encoded sub-signals comprises:

performing frame blocking and windowing on the transmission digital signal to obtain a plurality of pieces of second framed and windowed data corresponding to the transmission digital signal;

performing Fourier transform on each piece of second framed and windowed data to obtain second frequency-domain information of a corresponding piece of second framed and windowed data;

calculating a second power of each piece of second framed and windowed data at encoding frequency points based on the corresponding second frequency-domain information, in which the encoding frequency points are obtaining by Fourier transform based on frequencies corresponding to the plurality of characters; and sequentially determining the plurality of characters corresponding to the plurality of encoded sub-signals based on the second power of each piece of second framed and windowed data at the encoding frequency points.

18. An information transmission device, comprising:

a processor; and a memory for storing instructions executable by the processor;

wherein the processor is configured to:

encode information to be transmitted to obtain an ultrasonic encoded signal;

obtain an ultrasonic transmission signal based on the ultrasonic encoded signal and an ultrasonic wake-up signal, the ultrasonic wake-up signal for waking up an ultrasonic receiver to decode the ultrasonic encoded signal; and transmit the ultrasonic transmission signal to the ultrasonic receiver, wherein, the information to be transmitted comprises a plurality of characters arranged in sequence;

the processor is configured to:
sequentially convert the plurality of characters into a plurality of frequency values based on a correspondence between characters and frequency values;
obtain a plurality of encoded sub-signals corresponding to the plurality of characters based on the plurality of frequency values; and
sequentially encode the plurality of encoded sub-signals corresponding to the plurality of characters to form the ultrasonic encoded signal.

* * * * *